US012639828B1

(12) United States Patent
Hoye et al.

(10) Patent No.: US 12,639,828 B1
(45) Date of Patent: May 26, 2026

(54) DYNAMIC ADAS TRACKING METHOD

(71) Applicant: Lytx, Inc., San Diego, CA (US)

(72) Inventors: Erik Ryan Hoye, San Marcos, CA (US); Jesse Daniels, San Diego, CA (US); Johnson Wong, San Diego, CA (US)

(73) Assignee: Lytx, Inc., San Diego, CA (US)

( * ) Notice: Subject to any disclaimer, the term of this patent is extended or adjusted under 35 U.S.C. 154(b) by 432 days.

(21) Appl. No.: 18/087,419

(22) Filed: Dec. 22, 2022

(51) Int. Cl.
*G06T 7/246* (2017.01)
*G06V 10/20* (2022.01)
*G06V 10/94* (2022.01)
*G06V 20/56* (2022.01)

(52) U.S. Cl.
CPC ............ *G06T 7/246* (2017.01); *G06V 10/255* (2022.01); *G06V 10/955* (2022.01); *G06V 20/588* (2022.01); *G06T 2207/10016* (2013.01); *G06T 2207/30256* (2013.01)

(58) Field of Classification Search
CPC ........... G06T 7/246; G06T 2207/10016; G06T 2207/30256; G06V 10/255; G06V 10/955; G06V 20/588
See application file for complete search history.

(56) References Cited

U.S. PATENT DOCUMENTS

| | | | |
|---|---|---|---|
| 2016/0003636 A1* | 1/2016 | Ng-Thow-Hing ... | G01C 21/365 701/418 |
| 2016/0257308 A1* | 9/2016 | Pawlicki .............. | G06V 20/584 |
| 2019/0034740 A1* | 1/2019 | Kwant ................. | G06V 10/462 |
| 2019/0258251 A1* | 8/2019 | Ditty .................... | G05D 1/0274 |
| 2023/0028919 A1* | 1/2023 | Haeusler .................. | G06T 7/13 |

FOREIGN PATENT DOCUMENTS

| | | | | |
|---|---|---|---|---|
| CN | 115393536 A | * | 11/2022 | ............ B60W 40/06 |
| EP | 3475657 B1 | * | 6/2023 | ............ B60W 30/12 |

* cited by examiner

*Primary Examiner* — Oneal R Mistry
*Assistant Examiner* — Justin Philip Cascais
(74) *Attorney, Agent, or Firm* — Van Pelt, Yi & James LLP

(57) ABSTRACT

The system includes a camera, a processor, and a communications interface. The camera is mounted on a vehicle and has a predefined position with respect to the vehicle. The processor is configured to receive a sequence of images from the camera; determine a horizon in the sequence of images; determine lane line(s) in the sequence of images; track object(s) in the sequence of images; determine a projection using the horizon, the lane line(s), the object(s), and the predefined position of the camera, where the projection provides position and/or velocity information with respect to the vehicle for the lane line(s) and/or the object(s); determine whether to alert a driver based at least in part on the projection; and in response to determining to alert the driver, indicate to alert the driver. The communication interface coupled to the processor and configured to cause alerting the driver.

18 Claims, 7 Drawing Sheets

DYNAMIC ADAS TRACKING METHOD

BACKGROUND OF THE INVENTION

Advanced Driver Assistance Systems (ADAS) reduce accidents, injuries, and deaths through a variety of assistive applications that detect and warn (e.g., pedestrian and cyclist detection, drowsiness detection, lane departure and forward collision warnings, etc.). Modern transportation vehicles often include a vehicle event recorder (VER) in order to support driver safety, operational safety, and operational productivity. A vehicle event recorder typically includes a set of sensors (e.g., video camera, audio recorder, accelerometer, etc.) that report data that can be analyzed to determine the occurrence of incidents such as high-risk events, process inefficiencies, driver compliance, or anomalous events. However, after-market vehicle event recorders generally do not have access to multiple cameras, LIDAR, RADAR, and other vehicle-embedded sensor tools, which can add significant cost to the device, in order to estimate vehicle velocity and position and speed of approaching objects. This presents a problem for robust driver assistance systems because detecting and tracking objects is challenging especially where the data for the objects is often unreliable, noisy, or occluded for a period of time when acquired from a single camera perspective.

BRIEF DESCRIPTION OF THE DRAWINGS

Various embodiments of the invention are disclosed in the following detailed description and the accompanying drawings.

DETAILED DESCRIPTION

Figure 1:
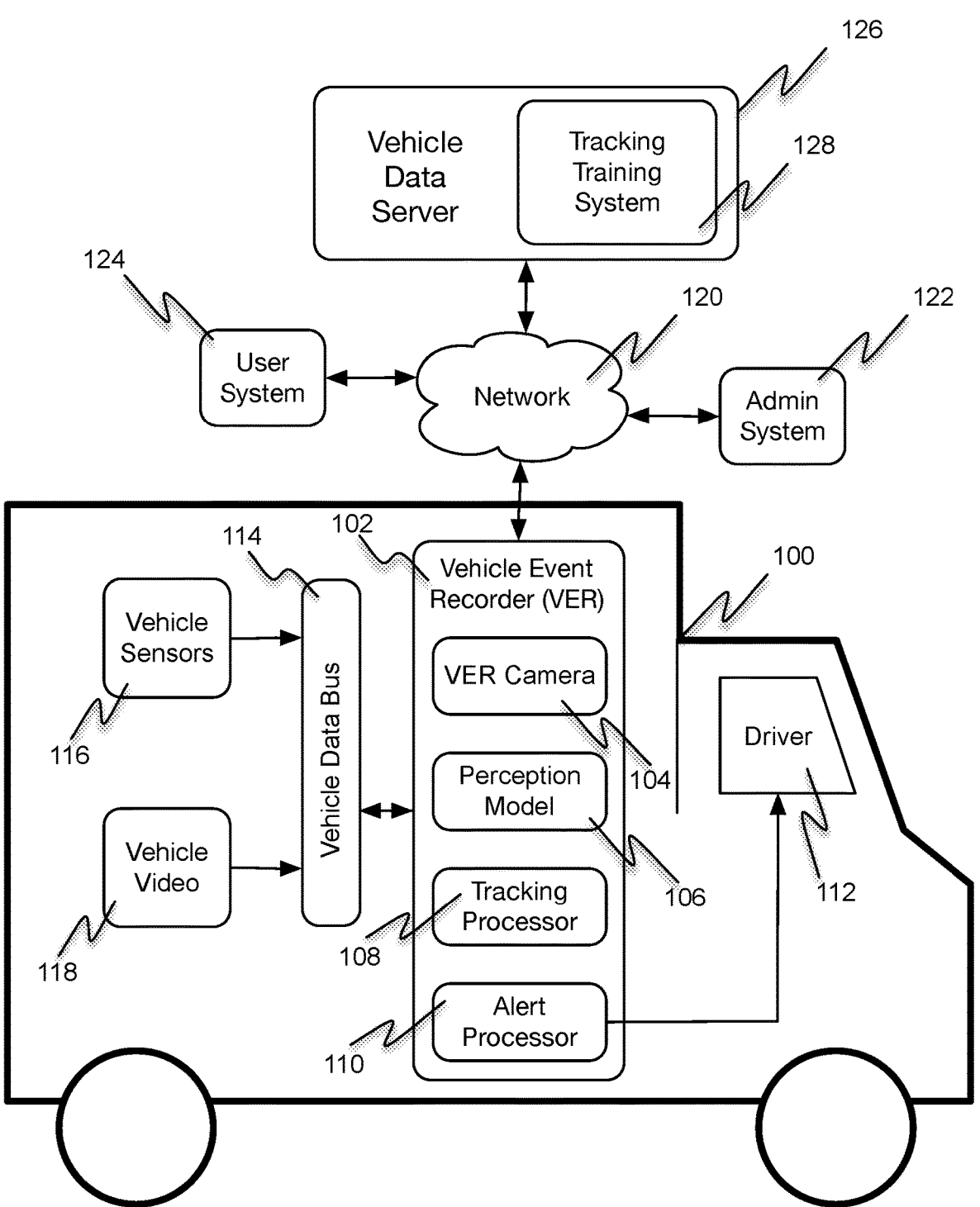
FIG. 1 is a block diagram illustrating an embodiment of a system for dynamic advanced driver assistance tracking.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task.

As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for dynamic advanced driver assistance tracking is disclosed. The system comprises a camera, a processor, and a communication interface. The camera is mounted on a vehicle, where the camera has a predefined position with respect to the vehicle. The processor is configured to receive a sequence of images from the camera, determine a horizon in the sequence of images, determine one or more lane lines in the sequence of images, and track one or more objects in the sequence of images. The processor is configured to determine a projection using the horizon, the one or more lane lines, the one or more objects, and the predefined position or pose of the camera, where the projection provides position, range, and/or velocity information with respect to the vehicle for the one or more lane lines and/or the one or more objects. The processor is configured to determine whether to alert a driver based at least in part on the projection and to indicate to alert the driver in response to determining to alert the driver. The communication interface is coupled to the processor and configured to cause alerting the driver in response to receiving the indication to alert the driver.

In some embodiments, the system for advanced driver assistance enables a device mounted in a vehicle to alert a driver when certain hazardous conditions occur. Using only a single forward-facing camera, the system is designed to efficiently identify and track objects and determine a set of conditions that may pose a danger to a driver of a vehicle (e.g., approaching a vehicle too fast, lane departure, object close by, etc.). In some embodiments, the system uses a determination of the horizon, lane locations, and objects to determine the location relation of the objects to the vehicle. In some embodiments, the tracking of one or more of the horizon, lane(s), and object(s) improves accuracy of the position determinations from the single camera images in order to provide the driver alerts. For example, a neural processing unit (NPU) implementing a perception model outputs the probability of the horizon location to a Kalman filter for tracking. Because a measurement of the horizon in a particular video frame may be unreliable (e.g., due to image noise, vehicle motion, image occlusion etc.) the Kalman filter reduces the uncertainty introduced by inaccurate horizon detections and outputs a smoothed estimate by iteratively comparing a prediction of the horizon location to the present measurement of the horizon's location. Because the dynamic advanced driver assistance system uses a single camera perspective to generate its own range and velocity estimates for an object (vs. LIDAR, RADAR, or other ranging sensors which independently measure distance), an accurate estimate of the horizon position is critical for determining a projection of objects from image coordinates (i.e., pixels) into vehicle coordinates (i.e., meters). In some embodiments, the position determination uses a transformation into a projection space (e.g., a bird's eye view of the area around the vehicle). In some embodiments, the processor is further configured to determine whether a horizon confidence value for the horizon is above a horizon threshold and in response to the horizon confidence value not being above the horizon threshold, suspending further processing and returning to determining the horizon. In some embodiments, the lanes and objects that are processed for the projection space (e.g., the bird's eye view) are validated for use in the alerting system (e.g., close enough for accurate position determination, stayed within view of camera, stayed within view for a certain amount of time, etc.). In response to not being validated, the objects are not used by the system for alerting the driver.

In some embodiments, lane tracking does not involve the use of Kalman Filters. The lane tracking method, which is used to estimate the left and right ego lane lines for each frame, includes the following processing steps:

1) Adaptive lane point extraction: based on the clustered perception lane model heatmap or probability map outputs the lane tracker excludes low-confidence lane points—for example, the point extraction method performs a local search around each high confidence point (e.g., within a predefined size area—for example, within a predefined radius) to exclude lower-confidence points, reducing the number of points required to accurately represent the line; in some embodiments, a lane is not validated unless there are a minimum number of points above a confidence threshold;

2) Curved lane detection: the method uses a goodness of fit test to determine if the lane line is a straight or curved line—If the lane line passes the fitness test for a straight line it is treated as a single straight line, otherwise it is designated as a curved lane line; in some embodiments, a lane is not valid in the event that the straight lane line slope of a lane line is greater than a threshold slope; in some embodiments, a lane is not valid in the event that the curved lane line curvature greater than a threshold curvature;

3) Lane Construction: for straight lines the lane line is formed by a weighted least squares fit to the extracted lane points; confidence is estimated as the probability output from the lane heatmap; curved lanes are represented by a clothoid curve, and fitted according to a clothoid curve fitting procedure; In some embodiments, a quadratic spline is used to represent curved lanes;

4) Tracking preceding frames: lane lines determined in a previous frame are used to help estimate lane lines in the current frame; lanes from preceding frames are matched to lane lines in the current frame using a custom poly distance metric which compares the size of polygons generated when matching a drawn old lane line to a new drawn lane line; potential lane lines are assigned weights based on their appearance in previous frames and the number of high confidence lane points; the weights are used to determine which potential left and right ego lane lines are considered "active" for the current frame via a ranking system; and 5) Lane Merging: based on the preceding lane matching procedure and weighting determination, the current lane marking parameters are calculated by weighing the lane parameters from the previous and current frame;

the final current frame lane markings are a weighted combination (e.g., a merging) of preceding and current frame parameters.

FIG. 1 is a block diagram illustrating an embodiment of a system for dynamic advanced driver assistance tracking. In the example shown, vehicle 100 comprises vehicle event recorder 102, vehicle data bus 114, vehicle video 118, vehicle sensors 116, and driver 112. Vehicle event recorder 102 further comprises VER camera 104, perception model 106, tracking processor 108, and alert processor 110. Vehicle event recorder 102 communicates to user system 124, vehicle data server 126, and admin system 122 via network 120. Vehicle data server 126 comprises tracking training system 128.

Vehicle event recorder 102 receives real-time data from VER camera 104, from vehicle video 118, and vehicle sensors 116 via vehicle data bus 114. In various embodiments, perception model 106 generates information regarding objects, the horizon, lanes, and/or any other appropriate information. In some embodiments, vehicle event recorder 104 processes the real-time data with perception model 106 and tracking processor 108 to generate video annotations and automated driver assistance alerts for driver 112 that are transmitted via network 120 to vehicle data server 126. In some embodiments, user system 124 queries vehicle data server 126 to view vehicle video annotated by perception model 106 and tracking processor 108 via network 120.

Admin system 122 administers instructions to tracking training system 128 via network 120 in order to optimize the performance of tracking processor 108. Tracking training system 128 receives training images and labels from vehicle data server 126 and outputs optimized tracking processor parameters to update tracking processor 108 via network 120. In some embodiments, tracking training system is implemented on a desktop system. For example, training is performed offline on a desktop, parameters are optimized, and a new version of a tracker system (e.g., software module to be run on a tracking processor as implemented on a Vehicle Event Recorder on a vehicle). For example, vehicle data server 126 produces synthetic driving scenario data comprising raw perfect (ground truth) detections for bounding boxes, lane detections, and horizon detections that are comparable to what perception model 106 produces. The tracking training system 128 compares the ground truth data to the output of tracking processor 108 and optimizes the Kalman filter parameters or other applicable methods for tracking processor 108 in response to various levels of injected noise. In some embodiments, lanes are not tracked using a Kalman filter and instead are tracked using a method comprising the steps: adaptive lane point extraction, curved lane detection, lane construction, tracking preceding frames, and lane merging.

In some embodiments, the system for dynamic advanced driver assistance tracking (e.g., tracking training system, perception model, and tracking processor) makes a computer better by enabling detection and tracking of lanes, horizons, and/or objects from a single camera perspective to be performed efficiently using limited processing resources.

Figure 2:
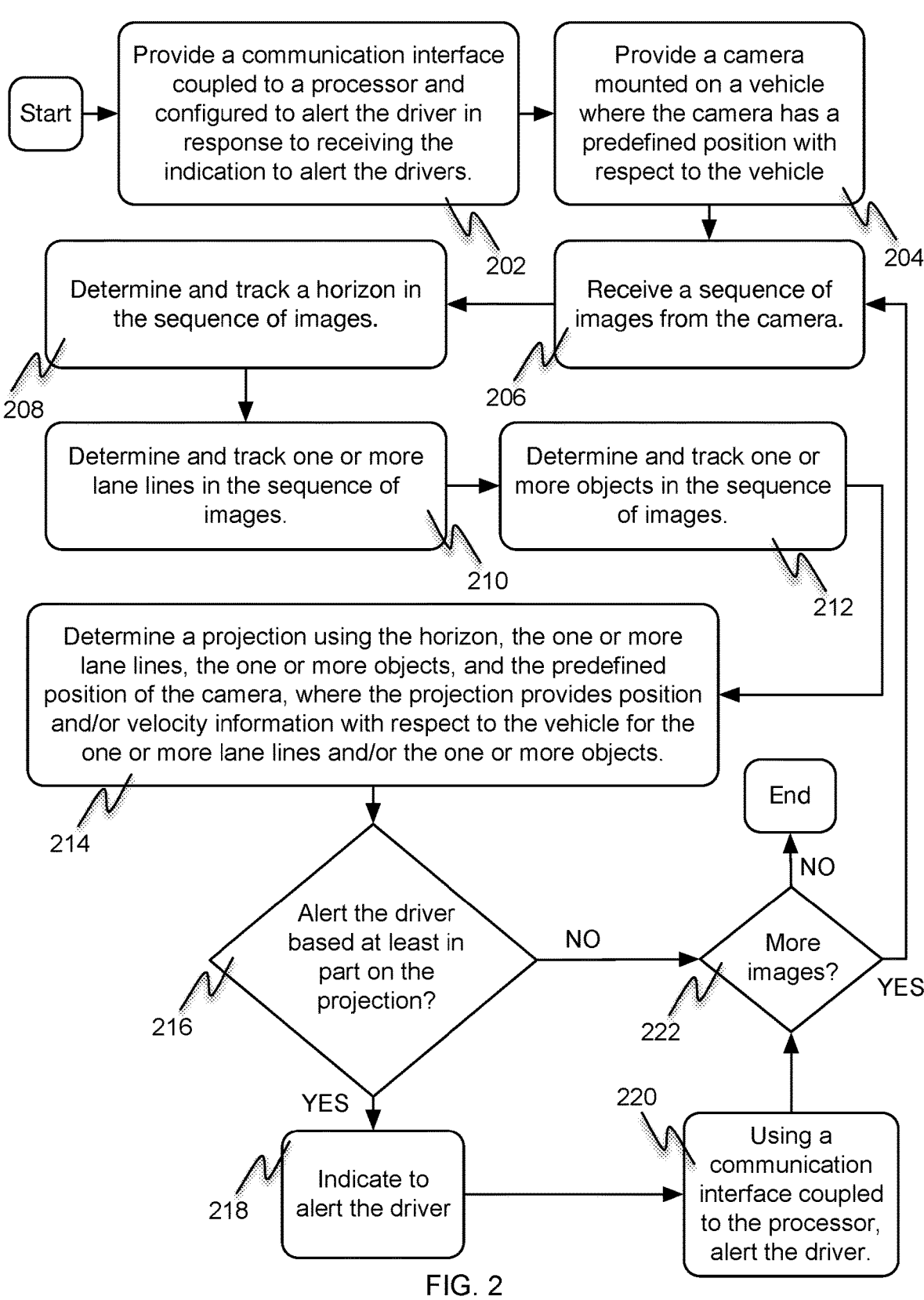
FIG. 2 is a flow diagram illustrating an embodiment of a system for dynamic advanced driver assistance tracking.

FIG. 2 is a flow diagram illustrating an embodiment of a system for dynamic advanced driver assistance tracking. In some embodiments, the process of FIG. 2 is executed by the system for dynamic advanced driver assistance tracking of FIG. 1. In the example shown in 202, a communication interface coupled to a processor and configured to alert the driver in response to receiving the indication to alert the drivers is provided and control is passed to 204. In 204, a camera mounted on a vehicle where the camera has a predefined position with respect to the vehicle is provided and control is passed to 206. In 206, a sequence of images from the camera is received and control is passed to 208. In various embodiments, a set of images is received from a VER camera. In some embodiments, a group of images is received from a vehicle camera or images are received from any other appropriate source(s). In some embodiments, VER camera is implemented by VER camera 104 of FIG. 1. In some embodiments, vehicle camera is implemented by vehicle camera 118 of FIG. 1.

In 208, a horizon in the sequence of images is determined and tracked, and control is passed to 210. For example, perception model 106 of FIG. 1 outputs a heat map determining the horizon probability that is used by tracking processor 108 to estimate an accurate horizon location by tracking the horizon location over time. In some embodiments, an accurate horizon location is required for providing collision warnings, headway warnings, or lane departure warnings.

In 210, one or more lane lines in the sequence of images is determined and tracked, and control is passed to 212. In some embodiments, lane lines are represented by straight lines, splines, quadratics, clothoids, or any other appropriate curved line. In various embodiments, lane detection and tracking are used by the alert processor in combination with object tracking to generate headway warnings (e.g., following too close to another vehicle in front of ego vehicle), forward closure warnings (e.g., closing speed on forward object is too fast and vehicle is within a threshold time of collision), rolling stop warnings (e.g., not a complete stop at an intersection with a detected stop sign), and lane departure warnings (e.g., leaving the lane without a blinker or signal).

In 212, one or more objects in the sequence of images is determined and tracked, and control is passed to 214. In some embodiments, a processor implementing a perception model is configured to determine one or more objects. In some embodiments, perception model is executed by perception model 106 of FIG. 1. In some embodiments, determining an object of the one or more objects comprises recognizing the object using an NPU and outputting a heatmap representing the probability of the object's location in the image. In some embodiments, the heatmap is decoded to better represent the object's location information for tracking tasks. In some embodiments, the tracking processor generates a continuous object track by estimating the position of the object for missing frames without object detection or interpolating noisy object positional data over time. In some embodiments, tracking processor is executed by tracking processor 108 of FIG. 1.

In 214, the horizon, the one or more lane lines, the one or more objects, and the predefined position of the camera is used to determine a projection. The projection provides position and/or velocity information with respect to the vehicle for the one or more lane lines and/or the one or more objects and control is passed to 216. In some embodiments, the projection comprises a bird's eye view. In some embodiments, the projection is determined using a homography matrix that is parametrized using the horizon line and vanishing point. For example, given a perspective image with the horizon pointing forward, the horizon can be used to estimate the tilt angle of the camera, and the lane lines can be used to estimate the vanishing point of the camera in order to construct a homography matrix for simulating the perspective of pointing the camera down like a bird's eye view.

In 216, whether to alert the driver based at least in part on the projection is determined. If it is determined to alert the driver, control is passed to 218, otherwise control is passed to 222. In 218, alerting the driver is indicated, and control is passed to 220. In 220, the driver is alerted using a communication interface coupled to the processor, and control is passed to 222. For example, a pedestrian is detected in the image and the bird eye view projection shows that the pedestrian is 20 m away and in the ego lane. As a result, the driver is alerted that there is a pedestrian ahead in its path. In 222, whether there are more images to be processed is determined. If there are more images to be processed, control passes to 206, otherwise the process ends.

Figure 3:
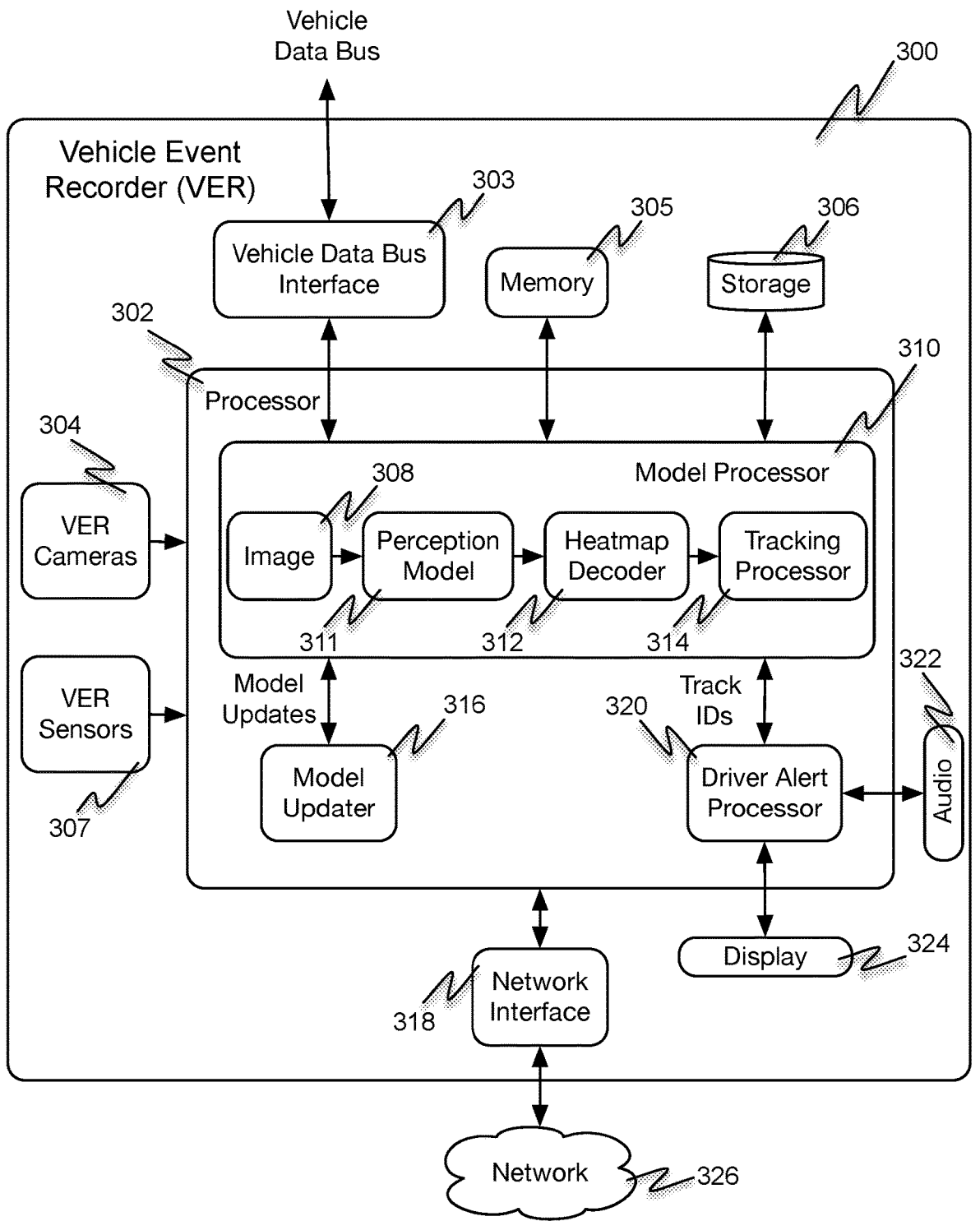
FIG. 3 is a block diagram illustrating an embodiment of a vehicle event recorder (VER).

FIG. 3 is a block diagram illustrating an embodiment of a vehicle event recorder (VER). In some embodiments, vehicle event recorder 300 of FIG. 3 is used to implement vehicle event recorder 102 of FIG. 1. In the example shown, vehicle event recorder 300 comprises processor 302, vehicle data bus interface 303, memory 305, storage 306, VER cameras 304, VER sensors 307, audio 322, display 324, and network interface 318. Processor 302 further comprises model processor 310, model updater 316, and driver alert processor 320. Model processor 310 further comprises input image interface 308, perception model 311 (e.g., that is implemented using a NPU), heatmap decoder 312, and tracking processor 314.

In the example shown, model processor 310 receives images using input image interface 308 from VER cameras 304 and/or other vehicle cameras via vehicle data bus interface 303. Perception model 311 processes the received images and generates heat maps indicating the probability of image feature types and locations (e.g., lane locations, number of lanes, horizon location, object types, object locations etc.). For example, perception model 311 produces a single heatmap for each object type (e.g., a heatmap for each of vehicles, pedestrians, traffic lights, cyclists, and stop signs). The object model also outputs an offset and scale annotation heatmap that is used to identify the precise location and size of potential object boxes at each pixel location. In some embodiments, lane heatmaps comprise 3 heatmaps: one heatmap indicating where the lanes exist in the image and two other heatmaps for vertical and horizontal "affinity fields" that are used to cluster the lane pixels to distinct lanes. In some embodiments, the horizon heatmap comprises a single heatmap indicating the location of horizon pixels.

In some embodiments, heatmap decoder 312 processes the probability heatmaps from perception model 311 and outputs the identifications and locations of features of interest in the image for input into tracking processor 314. For example, heatmap decoder 312 outputs heatmaps indicating where a high probability of a pedestrian in the image is and that the location of the pedestrian overlaps with the location of the current driving lane. Heatmap decoder 312 post processes the NPU-generated heatmaps. For example, peaks in the object heatmaps are located to identify object centers, and the corresponding scale and offset values are extracted at those peak locations in the scale and offset heatmaps to further refine the location of each object and the object's bounding box. In some embodiments, a threshold is applied to the lane heatmap intensity to segment out regions of likely lane locations. The likely lane locations are used to identify pixel regions where lanes exist. Further, the horizontal and vertical affinity field values are used at those thresholded lane pixel locations to cluster lanes together into individual entities. Horizon heatmaps are post-processed by extracting the points in the heatmap containing the highest horizon probability, and these top most confident points are then fit with a straight line to determine a horizon line.

Driver alert processor 320 communicates with the driver via audio 322 and display 324. For example, model processor 310 identifies that the vehicle is not centered in a determined lane and that there is a pedestrian in the field of view. Driver alert processor 320 receives validated tracks from tracking processor 314 and data from VER sensors 307. Driver alert processor 320 sends the driver a warning message via audio 312 and/or display 316. For example, the warning message may indicate that the vehicle is drifting from the current lane, that the vehicle speed is high, that there is a pedestrian ahead, and/or any other appropriate warning message. In various embodiments, the driver is alerted with a collision warning (e.g., closing in on an object too quickly), a headway warning (e.g., tailgating, not leaving enough room in front of the vehicle during driving conditions), lane departure warning (e.g., crossing a lane without indicating with turn signal), fitness to lane warning (e.g., how well vehicle keeps within the lane), a rolling stop warning (e.g., vehicle did not come to a complete stop when stop sign applicable to vehicle is present), and/or any other appropriate warning.

Model processor 310 optimizes tracking parameters via model updater 316. For example, tracking training system 128 of FIG. 1 learns new optimal Kalman filter parameters and admin system 118 of FIG. 1 instructs vehicle data server 120 of FIG. 1 to deploy the new parameters to the vehicle. Vehicle data server 120 sends the new parameters to the vehicle's model updater 316 via network 326, and model updater 316 updates the parameters in tracking processor 314.

In some embodiments, model processor 310 sends and receives data from storage 306. For example, when network 326 is unavailable, model processor 310 stores tracking streams from tracking processor 314 until network 326 is available. In some embodiments, model processor 310 sends and receives data from memory 305 during processing for temporary storage.

Figure 4:
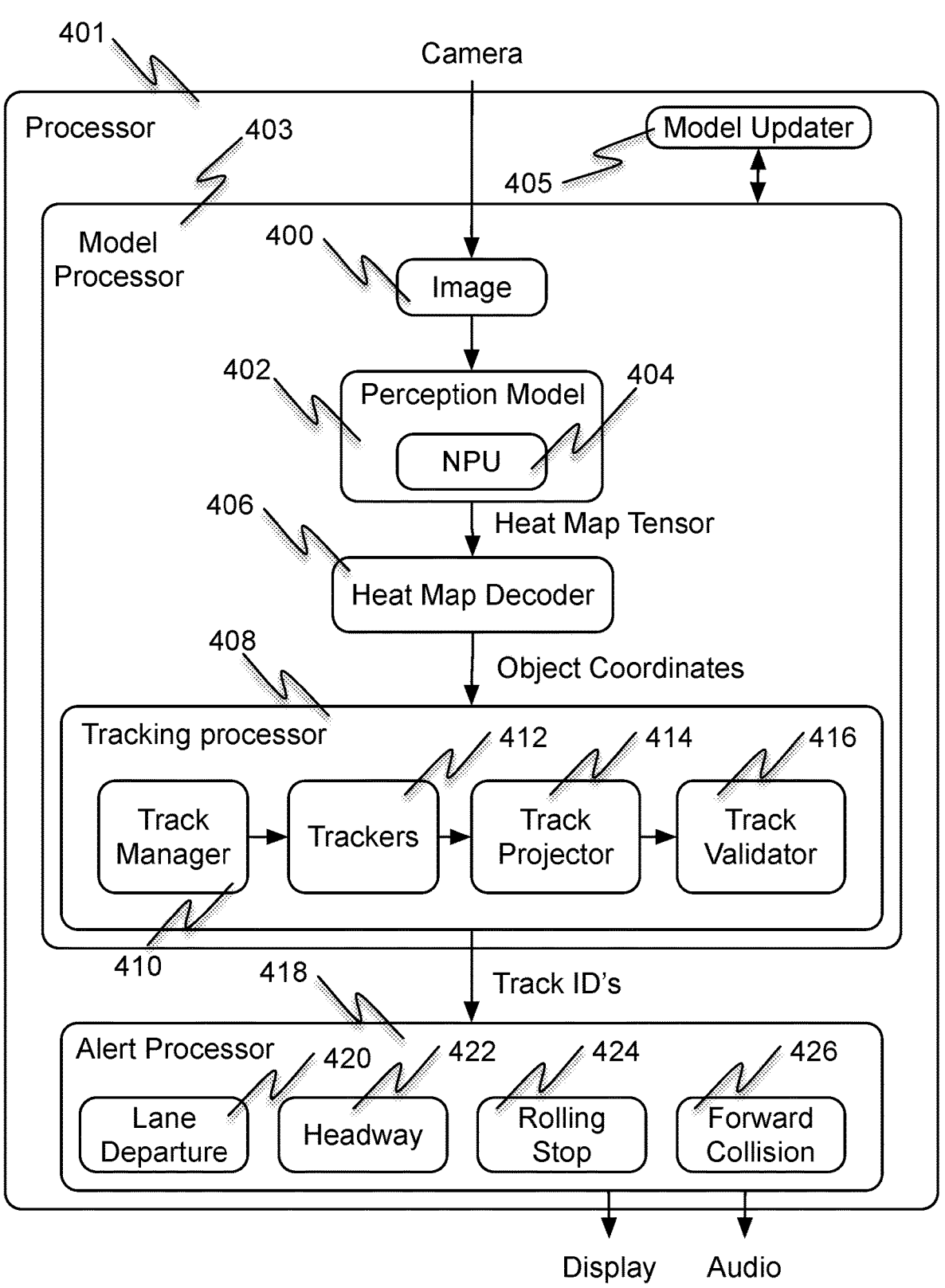
FIG. 4 is a block diagram illustrating an embodiment of a processor for a vehicle event recorder (VER).

FIG. 4 is a block diagram illustrating an embodiment of a processor for a vehicle event recorder (VER). In some embodiments, vehicle event recorder processor 401 of FIG. 4 is used to implement vehicle event processor 302 of FIG. 3. In the example shown, perception model processor 402 of model processor 403 receives sequential images 400 from cameras associated with the vehicle (e.g., vehicle event recorder camera or vehicle camera(s)) and outputs heatmap tensors to heatmap decoder 406. In some embodiments, perception model 402 uses neural processing unit (NPU) 404 to calculate a number of output object heat maps related to multiple tasks. For example, the perception model determines one or more of an object heat map, a lane heat map, and a horizon heatmap. In various embodiments, the object heat map comprises one or more of: a vehicle object heat map, a pedestrian object heat map, a cyclist object heat map, a stop sign object heat map, and/or any other appropriate object heat map. In some embodiments, the perception model determines a horizon heat map. In some embodiments, the horizon heat map comprises high probability horizon pixels. In some embodiments, the perception model determines a lane heat map. In some embodiments, the lane heat map comprises one or more of: a lane location heat map, one or two vertical affinity fields for lanes, and/or a horizontal affinity field for lanes.

In the example shown, heat map decoder 406 receives heat map tensors from perception model 402 and outputs object coordinates to tracking processor 408. For example, the horizon heat map is post processed by heat map decoder 406 which performs one or more of: thresholding, determining a number of highest value points, fitting a line through a number of points, determining an angle of a horizon line as a horizon annotation, determining an offset location of a horizon line as a horizon annotation, and/or any other appropriate processing of a horizon heat map. In various embodiments, the lane heat map is post processed by one or more of thresholding the lane heat map to determine lane areas, determining a vector field as a lane annotation, determining a change in vector field direction, determining a vertical or a near vertical vector associated with a location in the lane heat map to cluster the lanes areas, determining a change in an image row of a vector field direction to identify a lane edge point, fitting a cubic spline to sets of lane edge points as a lane annotation, and/or any other appropriate lane heat map. In some embodiments, the object heat map is post processed by heat map decoder 406 to generate object locations and object bounding boxes. In some embodiments, the heatmap is decoded to generate one or more object locations and associated box coordinates.

In some embodiments, tracking processor 408 receives object coordinates from heat map decoder 406 and outputs validated persistent tracks to driver alert processor 418. In some embodiments, the raw heat map decoder outputs are noisy (e.g., missing detections, unreliable object bounding box location, poor containment of the object, etc.). However, in order to provide accurate and reliable driver alerts, the object coordinates provided to the alert processor need to be robust and accurate. For example, if a detection is missed for a particular image frame or the detected object location is inaccurate or physically implausible, tracking processor 408 interpolates the incoming data to provide a continuous and physically plausible object position estimate. In some embodiments, the tracking processor uses tracker(s) 412 (e.g., Kalman Filter or other applicable method tracker(s)) to provide robust estimates of object location and object velocity given noisy and unreliable object detection data from heat map decoder 406.

In some embodiments, tracking processor 408 comprises track manager 410, tracker(s) 412 (e.g., Kalman Filter or other applicable method tracker(s)), track projector 414, and track validator 416. In the example shown, track manager 410 assigns incoming object data as a new track, a candidate track, or a validated track to a track manager list. In some embodiments, tracker(s) 412 filters data from the track manger list to estimate the current object position using prior data. In some embodiments, track projector 414 projects the object track from image space into a bird's eye view of vehicle space using a homographic projection parameterized by the horizon and vanishing point of the camera. In some embodiments, track validator 416 determines if a track is valid or should be removed from the track manager list. For example, a new object is detected at a distance greater than an out-of-range threshold (e.g., 80 m away) and the track manger adds the new track to the track manager list. As another example, a new ground-based object is detected at a distance greater than a forward out-of-range threshold and a lateral out-of-range threshold (e.g., 60 m forward threshold and a +/−12 m lateral threshold from the center of the ego vehicle) and the track manger adds the new track to the track manager list. In some embodiments, ground-based objects include those that are assumed to lie on the ground plane such as Vehicles, Pedestrians, and Cyclists. Any ground objects within this region of interest are considered validated by the tracker, otherwise it is recorded, but considered "invalid" and not used as part of alert processing. The object is detected in subsequent image frames at a distance just at or below the out-of-range threshold (e.g., 80 m) and the track manager adds the object data and location to the track manager list as a candidate track where is it tracked by tracker(s) 412. As more object detections are added to the list, the uncertainty of the tracker (e.g., a Kalman Filter tracker) decreases until it is below a threshold and the persistent track is validated track and used to alert the driver if indicated by the driver alert processor 418 (e.g., headway warning, collision warning, etc.).

In some embodiments, driver alert processor 418 comprises alerting logic for lane departure 420, headway 422, rolling stop 424, forward collision 426, or any other appropriate alerting logic. For example, driver alert processor 418 receives track IDs for validated persistent tracks from tracking processor 408. In the example shown, lane departure module 420 analyzes the incoming persistent track to determine if the vehicle's wheels are near or have crossed a lane boundary and indicates a lane boundary warning. Headway module 422 analyzes the incoming persistent track to determine if the distance to the forward vehicle is within a threshold distance and indicates a headway warning. Rolling stop 424 analyzes the incoming persistent track to determine if the vehicle is performing a rolling stop and indicates a rolling stop warning. Forward collision module 426 analyzes the incoming persistent track to determine if the vehicle's path intersects with a forward object and is within a threshold distance and indicates a collision warning. Driver alert processor 418 determines whether to alert a driver and provides indications to either a display or audio output for the driver.

In some embodiments, model updater 405 updates model processor 403 upon receipt of a new model from a server.

Figure 5A:
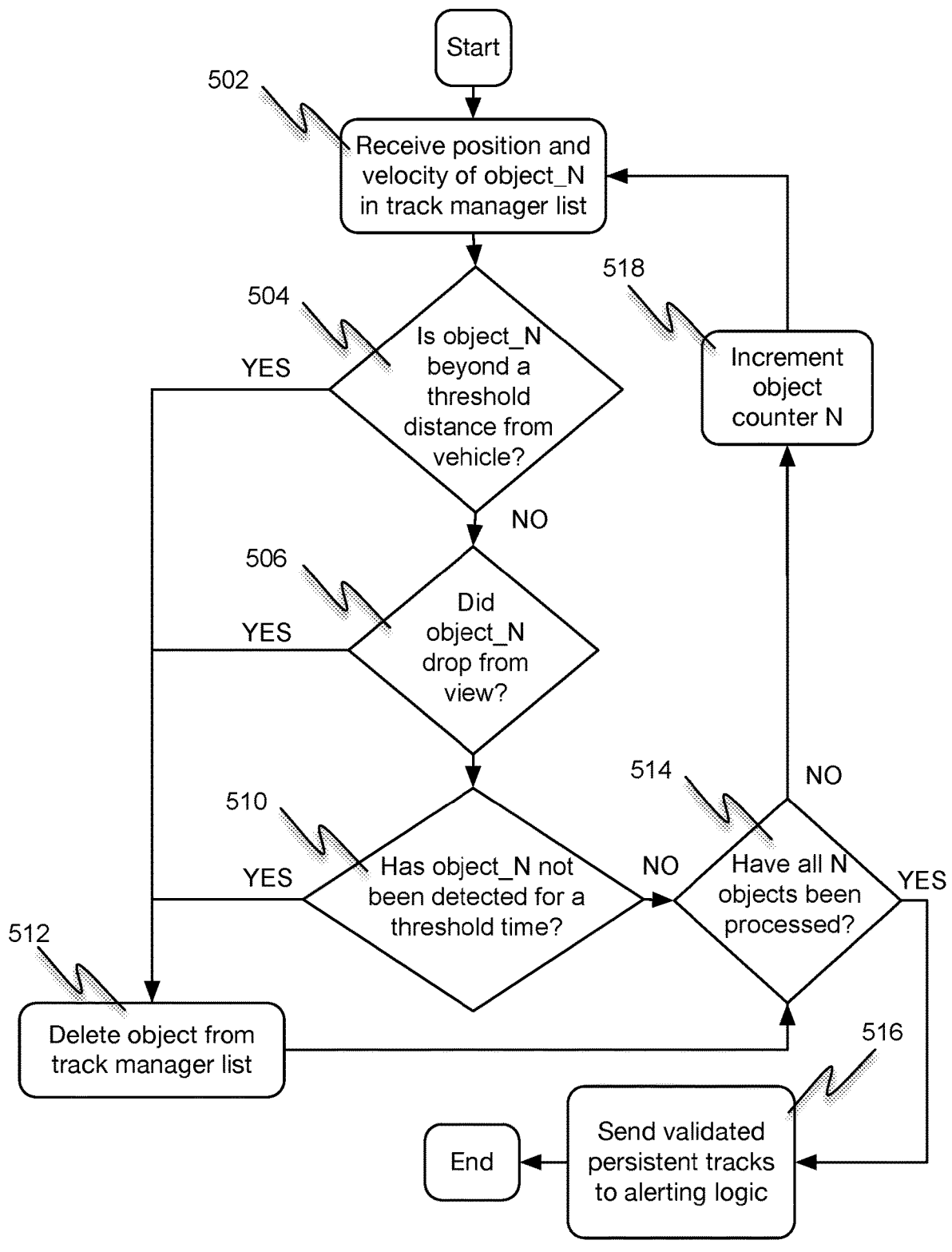
FIG. 5A is a flow diagram illustrating an embodiment of a system for validating tracks for a dynamic advanced driver assistance tracking system.

FIG. 5A is a flow diagram illustrating an embodiment of a system for validating tracks for a dynamic advanced driver assistance tracking system. In some embodiments, the process of FIG. 5A is executed by track validator 416 of FIG. 4. In the example shown in 502, the position and velocity of object_N in the track manager list is received, and control is passed to 504.

In 504, it is determined whether object_N is beyond a threshold distance from the vehicle. In response to object_N being beyond a threshold distance from the vehicle, control is passed to 512. In response to object_N not being beyond a threshold distance from the vehicle, control is passed to 506. For example, an object (e.g., a cyclist) is determined to be far away (e.g., 80 m) in front of the vehicle. Because the position and velocity estimates of far away objects are unreliable and far away objects are unlikely to interact with the vehicle, tracking such objects is deemed to be unnecessary, and the tracking of the object track is removed from the track manager list (e.g., the track is removed from the list). Removing unreliable or low-risk object tracks reduces the computational load on the tracking system and allows the tracking system to focus computing resources on more relevant potential risks.

In 506, it is determined whether object_N has dropped from view. In response to object_N having dropped from view, control is passed to 512. In response to object_N not having dropped from view, control is passed to 510. For example, an object (e.g., a cyclist) is tracked crossing a street in front of the vehicle and then disappears from the image frame. While the Kalman filter can continue to track the expected position of the object given the prior path and speed of the object for a short time, after a threshold time tracking the object is determined not to be necessary, and the track is removed from the track manager list. Removing unreliable or low-risk tracks reduces the computational load on the tracking system and allows the tracking system to focus computing resources on more relevant potential risks.

In 510, it is determined whether object_N has not been detected for a threshold time. In response to object_N having not been detected for a threshold time, control is passed to 512. For example, a false-positive detection of an object (e.g., a pedestrian) position and velocity is received by the track validation system and subsequent image frames contain no further similar (e.g., pedestrian) detections, then the object is deemed a false-positive detected object, and the track is removed from the track manager list. In response to object_N being detected within a threshold time, control is passed to 514.

In 512, object_N is deleted from the track manager list, and control is passed to 514. In 514, it is determined whether all N objects have been processed. In response to all N objects having been processed, control is passed to 516. In response to all N objects not having been processed, control is passed to 518. In 518, the object counter is incremented, and control is passed to 502. In 516, validated persistent tracks are sent to the alerting logic, and the process ends. For example, the remaining tracks still in the track manager list correspond to tracks that have passed the tests for being valid (e.g., tracks close enough, tracks still in view, and tracks present), and these now validated persistent tracks are sent on to be tested to see whether an alert needs to be generated related to these validated persistent tracks.

Figure 5B:
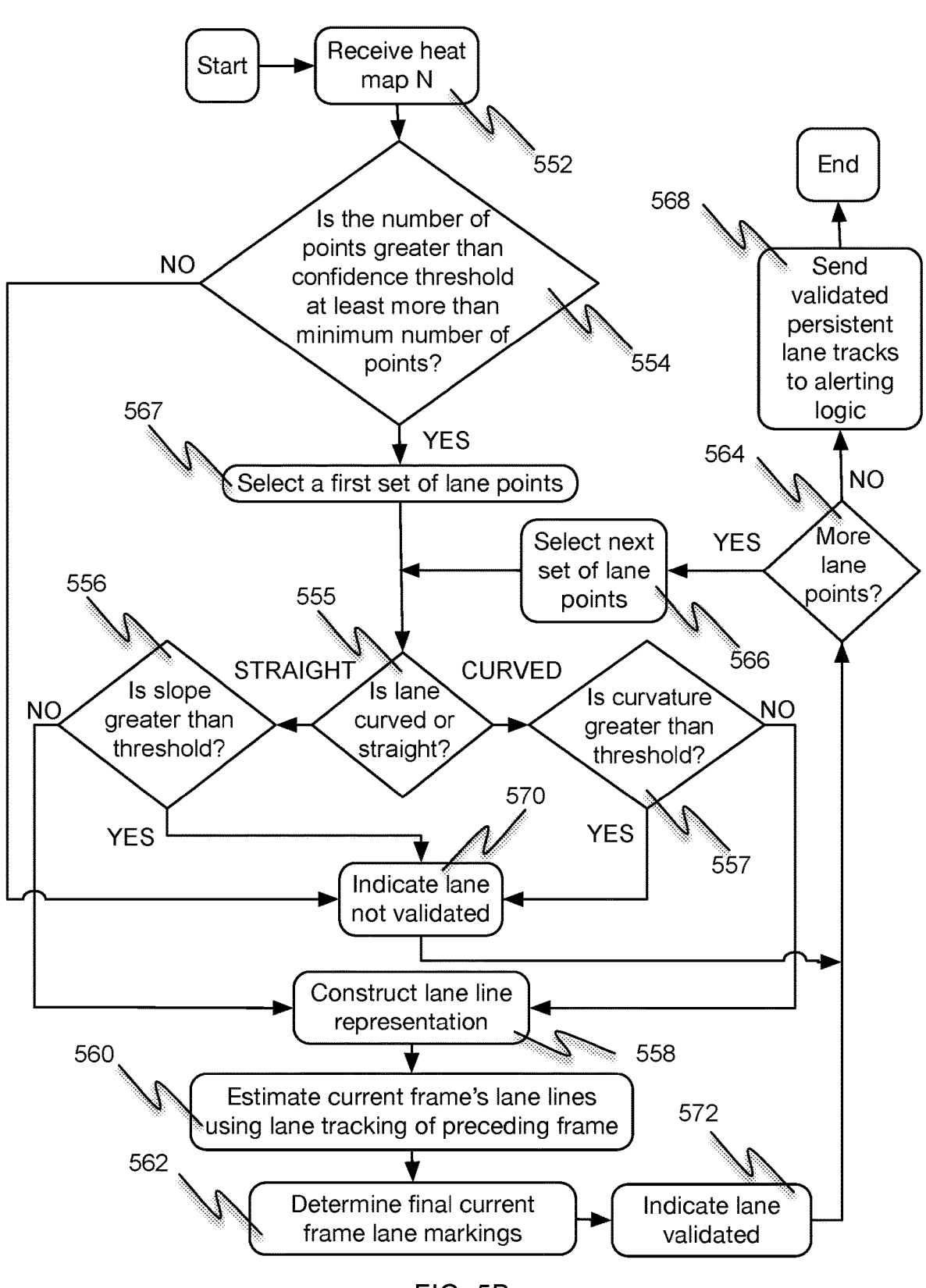
FIG. 5B is a flow diagram illustrating an embodiment of a system for validating lanes for a dynamic advanced driver assistance tracking system.

FIG. 5B is a flow diagram illustrating an embodiment of a system for validating lanes for a dynamic advanced driver assistance tracking system. In some embodiments, the process of FIG. 5B is executed by track validator 416 of FIG. 4. In the example shown in 552, a heat map N is received, and control is passed to 554. In 554, it is determined whether the number of points greater than confidence threshold at least more than minimum number of points. For example, adaptive lane points are extracted. Based on the clustered perception lane model heatmap or probability map outputs, the lane tracker excludes low-confidence lane points by performing a local search around each high confidence point and excluding points too far from a high confidence point (e.g., points farther than a threshold distance from a peak confidence point are excluded); this reduces the number of points required to accurately represent the line. In response to the number of points not being greater than the minimum number of points, in 570 it is indicated that the lane is not validated, and control passes to 564. In response to the number of points being greater than the number of minimum number of points, control passes to 567. In 567, a first set of lane points is selected, and control passes to 555. In 555, it is determined whether the lane is curved or straight. For example, a goodness of fit test for a lane line to the set of lane points to determine whether the lane line is a straight or curved line. In response to the lane line having a confidence level above or equal to a threshold confidence level for being a straight line, the lane line is treated as a single straight line, and control passes to 556. In 556 it is determined whether the lane line slope is greater than a threshold. In response to the lane line slope being greater than the threshold, control passes to 570. In response to the lane line slope not being greater than the threshold, control passes to 558. In response to the lane line having a confidence level below a threshold confidence for being a straight line, the lane line is designated as a curved lane line, and control passes to 557. In response to the lane line curvature being greater than the threshold, control passes to 570. In response to the lane line curvature not being greater than the threshold, control passes to 558. In 558, the lane is constructed. For example, for straight lines the lane line is formed by a weighted least squares fit to the extracted lane points; confidence is estimated as the probability output from the lane heatmap; curved lanes are represented by a clothoid curve and fitted according to a clothoid curve fitting procedure. In some embodiments, a quadratic spline is used to represent curved lanes. In 560, estimate current frame lane lines. For example, using tracking of preceding frame (e.g., frame from heat map N−1) lane lines, estimate lane lines in the current frame; lanes from preceding frames are matched to lane lines in the current frame using a custom poly distance metric which compares the size of polygons generated when matching a drawn old lane line to a new drawn lane line; potential lane lines are assigned weights based on their appearance in previous frames and the number of high confidence lane points; the weights are used to determine which potential left and right ego lane lines are considered "active" for the current frame via a ranking system. In some embodiments, lanes from preceding frames are matched to lane lines in the current frame using a RMS distance metric between the preceding frame lane lines and the current frame lane lines. In 562, determine final current frame lane markings. For example, based on the preceding lane matching procedure and weighting determination, the current lane marking parameters are calculated by weighing the lane parameters from the previous and current frame; the final current frame lane markings are a weighted combination of preceding and current frame parameters. In 572, it is indicated that the lane is validated. In 564, it is determined whether there are more lane lines to process. In response to there being more lane lines, control passes to 566. In 566, a next set of lane line points is selected, and control passes to 557. In response to there not being more lane lines to process, in 568, validated persistent lane tracks are sent to alerting logic, and the process ends.

Figure 6:
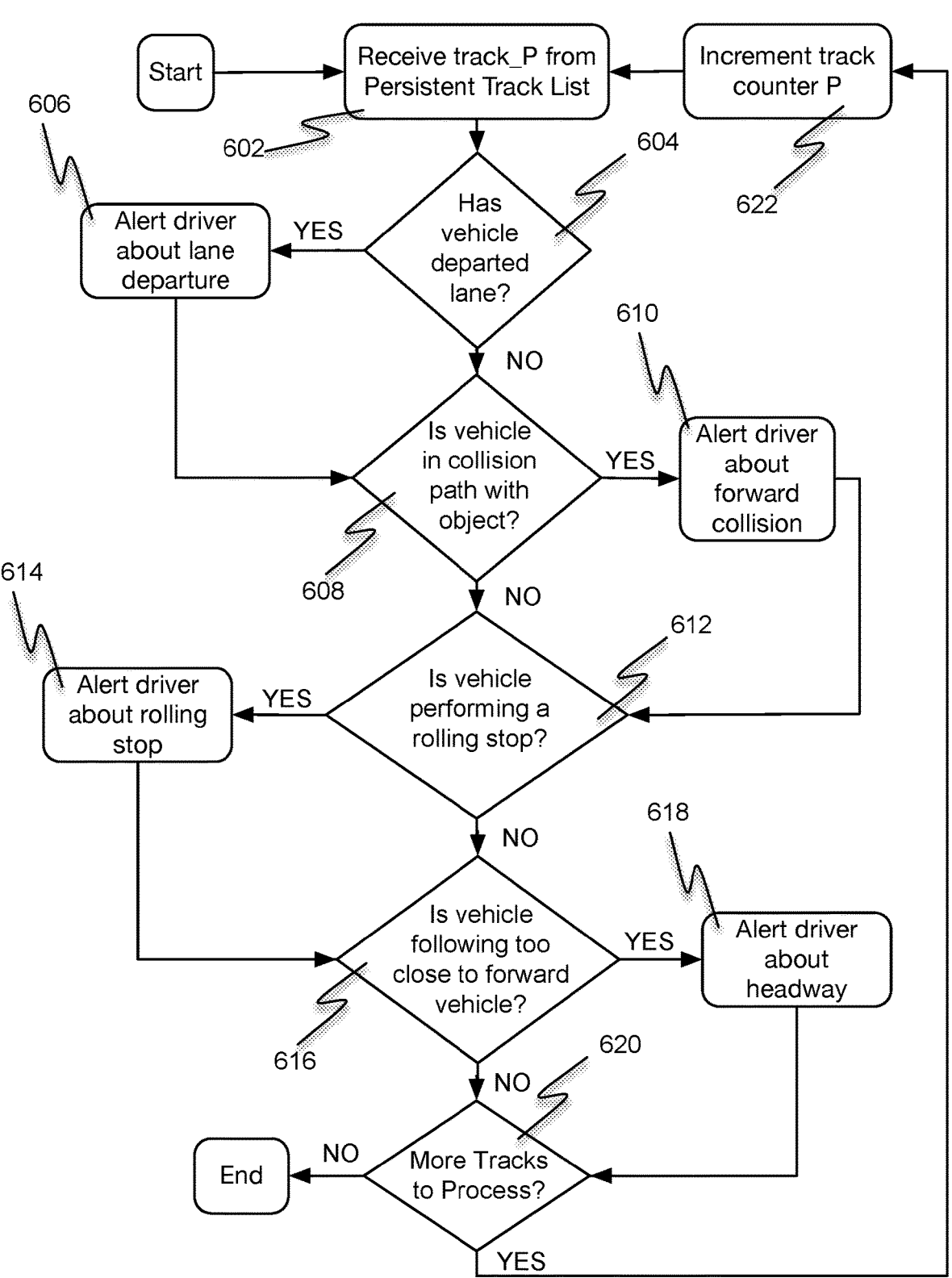
FIG. 6 is a flow diagram illustrating an embodiment of a system for alerting a driver in a dynamic advanced driver assistance tracking system.

FIG. 6 is a flow diagram illustrating an embodiment of a system for alerting a driver in a dynamic advanced driver assistance tracking system. In some embodiments, the process of FIG. 6 is executed by driver alert processor 418 of FIG. 4. In the example shown, in 602, track_P from a persistent track list is received and control is passed to 604.

In 604, it is determined whether the vehicle has departed the ego lane using data from track_P. For example, a vehicle has departed the ego lane in the event that: 1) the ego vehicle is going faster than a threshold speed; 2) the ego vehicle is touching the lane line; 3) the ego vehicle is, on average, moving towards the same lane line; 4) the ego lane is wide enough with some buffer for the ego vehicle; 5) the ego vehicle is not indicating a lane change with a blinker being active or during a cooldown time period after a blinker being active; 6) a warning has not been issued recently; and 7) the ego vehicle was consistently in a given lane before transitioning to being out of lane. In response to determining that the vehicle has departed the ego lane, control is passed to 606. In 606, the driver is alerted about lane departure, and control is passed to 608. In response to determining that the vehicle has not departed the ego lane, control is passed to 608.

In 608, it is determined whether the vehicle is on a collision path with an object. For example, a vehicle is on a collision path with an object in the event that: 1) the ego vehicle is going a speed greater than a threshold speed; 2) a relevant object must be a valid track and in the ego lane that the ego vehicle is in; 3) the time to collision (e.g., TTC=range/(relative velocity of object to ego vehicle) to the ego vehicle with the relevant object must be below a given threshold; and 4) the ego vehicle must be in this state for a time greater than a threshold period of time. In response to determining that the vehicle is on a collision path with an object, control is passed to 610. In 610, the driver is alerted about a forward collision and control is passed to 612. In response to determining that the vehicle is not on a collision path with an object, control is passed to 612. In some embodiments, a collision warning comprises a warning that the ego vehicle is on a path to collide with an object comprising a vehicle, a pedestrian, or a cyclist. In some embodiments, the collision is a forward collision. In some embodiments, the collision is a lateral collision and the collision path does not require the object to be in the ego lane.

In 612, it is determined whether a vehicle is performing a rolling stop. For example, the vehicle is performing a rolling stop in the event that: 1) there is a valid stop sign, meaning tracker for stop sign is above a confidence threshold; 2) the stop sign is on appropriate side of camera center (e.g., in the US, on the right side of camera center; in the UK, Australia, New Zealand, or Hong Kong, on the left side of center); 3) the ego vehicle is passing the stop sign; 4) the stop sign is greater than a threshold size; and 5) the ego vehicle velocity has not dropped below a given threshold for a given period of time. In response to determining that the the vehicle is performing a rolling stop, control is passed to 614. In 614, the driver is alerted about the rolling stop, and control is passed to 616. In response to determining that the vehicle is not performing a rolling stop, control passes to 616.

In 616, it is determined whether the vehicle is following too close to a forward vehicle. For example, a vehicle is following too close to a forward vehicle in the event that: 1) the ego vehicle is going a speed greater than a threshold speed; 2) a relevant object must be a valid track and in the ego lane that the ego vehicle is in; 3) the ego vehicle must be within a certain distance called the headway threshold (e.g., headway threshold=(2 seconds*ego velocity)); and 4) the ego vehicle must be in this state for a a time greater than a threshold period of time. In response to the vehicle following too close to the forward vehicle, control is passed to 618. In 618, the driver is alerted about there not being enough headway distance to the forward vehicle, and control is passed to 620. In response to the vehicle not following too close to the forward vehicle, control is passed to 620.

In 620, it is determined whether there are more tracks to process. In response to there being more tracks to process, control is passed to 622. In 622, the track counter P is incremented, and control is passed to 602. In response to there not being more tracks to process, the process ends.

What is claimed is:
1. A system, comprising:
a camera, wherein the camera is mounted on a vehicle in a predefined position with respect to the vehicle to provide a forward-facing single camera perspective;
a processor configured to:
receive a sequence of images from the camera, wherein the sequence of images comprises a current frame;
determine a tracking of a horizon, one or more lane lines, and one or more objects based on the sequence of images;
determine whether a horizon confidence value for the horizon in the current frame exceeds a threshold;
in response to a determination that the horizon confidence value does not exceed the threshold, cease tracking the one or more lane lines and the one or more objects and redetermine the tracking of the horizon to obtain an updated horizon confidence value of the horizon:

in response to a determination that the horizon confidence value or the updated horizon confidence value exceeds the threshold, determine whether to alert a driver of the vehicle based at least in part on a projection, wherein the projection is determined using the tracking of the horizon, the one or more lane lines, and the one or more objects for the current frame;

in response to determining to alert the driver of the vehicle based at least in part on the projection, send an indication to alert the driver; and a communication interface coupled to the processor and configured to cause alerting the driver via an audio device mounted to the vehicle and/or a display device mounted to the vehicle in response to receiving the indication to alert the driver.

2. The system of claim 1, wherein the processor is further configured to track the horizon.

3. The system of claim 1, wherein the processor is further configured to track the one or more lane lines.

4. The system of claim 1, wherein the processor is further configured to determine the one or more objects.

5. The system of claim 4, wherein determining an object of the one or more objects comprises recognizing the object using an NPU.

6. The system of claim 1, wherein the projection comprises a bird's eye view.

7. The system of claim 1, wherein the processor is further configured to validate a track associated with an object of the one or more objects to create a set of validated object tracks.

8. The system of claim 7, wherein validating the track associated with the object comprises determining whether the object is beyond a threshold distance from the vehicle.

9. The system of claim 8, wherein in response to the object being beyond the threshold distance from the vehicle, the processor is further configured to indicate to delete object from a validated track manager list.

10. The system of claim 7, wherein validating the track associated with the object comprises determining whether the object dropped from view.

11. The system of claim 10, wherein in response to the object being dropped from view, the processor is further configured to indicate to delete object from a validated track manager list.

12. The system of claim 7, wherein validating the track associated with the object comprises determine whether the object has not been detected for a threshold time.

13. The system of claim 12, wherein in response to the object not being detected for the threshold time, the processor is further configured to indicate to delete the object on a validated track manager list.

14. The system of claim 7, wherein in response to the object not being beyond a threshold distance from a vehicle, not dropping from view, and being detected within a threshold time, the processor is further configured to indicated to keep the object on a validated track manager list.

15. The system of claim 14, wherein the processor is further configured to provide the validated track manager list to alerting logic.

16. The system of claim 15, wherein the alerting logic determines using the validated track manager list whether to alert the driver regarding one or more of the following: a lane departure, a forward collision, a rolling stop, and/or about headway.

17. A method, comprising:

receiving a sequence of images from a camera, wherein the camera is mounted on a vehicle in a predefined position with respect to the vehicle to provide a forward-facing single camera perspective, and wherein the sequence of images comprises a current frame;

determining a tracking of a horizon, one or more lane lines, and one or more objects based on the sequence of images;

determining whether a horizon confidence value for the horizon in the current frame exceeds a threshold;

in response to a determination that the horizon confidence value does not exceed the threshold, ceasing tracking the one or more lane lines and the one or more objects and redetermine the tracking of the horizon to obtain an updated horizon confidence value of the horizon:

in response to a determination that the horizon confidence value or the updated horizon confidence value exceeds the threshold, determining whether to alert a driver of the vehicle based at least in part on a projection, wherein the projection is determined using the tracking of the horizon, the one or more lane lines, and the one or more objects for the current frame;

in response to determining to alert the driver of the vehicle based at least in part on the projection, sending an indication to alert the driver; and causing to alert the driver via an audio device mounted to the vehicle and/or a display device mounted to the vehicle in response to receiving the indication to alert the driver.

18. A computer program product embodied in a non-transitory computer readable medium and comprising instructions for:

receiving a sequence of images from a camera, wherein the camera is mounted on a vehicle in a predefined position with respect to the vehicle to provide a forward-facing single camera perspective, and wherein the sequence of images comprises a current frame;

determining a tracking of a horizon, one or more lane lines, and one or more objects based on the sequence of images;

determining whether a horizon confidence value for the horizon in the current frame exceeds a threshold;

in response to a determination that the horizon confidence value does not exceed the threshold, ceasing tracking the one or more lane lines and the one or more objects and redetermine the tracking of the horizon to obtain an updated horizon confidence value of the horizon:

in response to a determination that the horizon confidence value or the updated horizon confidence value exceeds the threshold, determining whether to alert a driver of the vehicle based at least in part on a projection, wherein the projection is determined using the tracking of the horizon, the one or more lane lines, and the one or more objects for the current frame;

in response to determining to alert the driver of the vehicle based at least in part on the projection, sending an indication to alert the driver; and causing to alert the driver via an audio device mounted to the vehicle and/or a display device mounted to the vehicle in response to receiving the indication to alert the driver.

* * * * *